H. E. TRIPP.
BAKING PAN.
APPLICATION FILED AUG. 2, 1918.
1,308,821. Patented July 8, 1919.
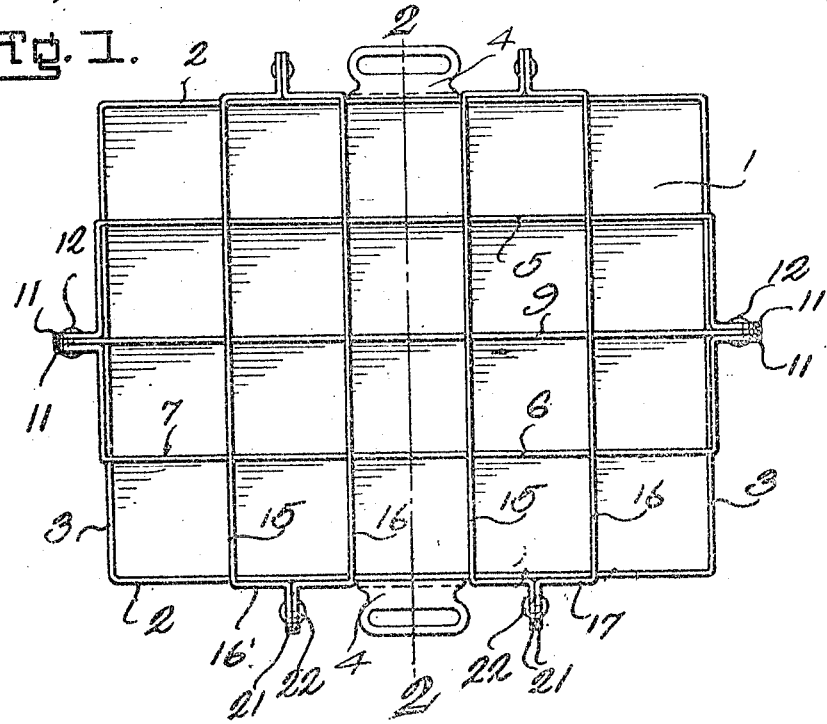
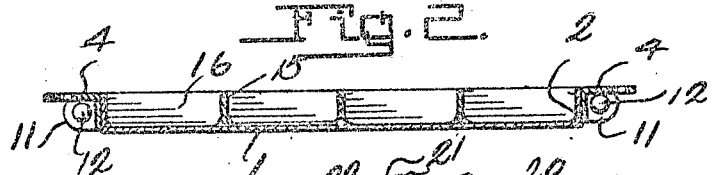
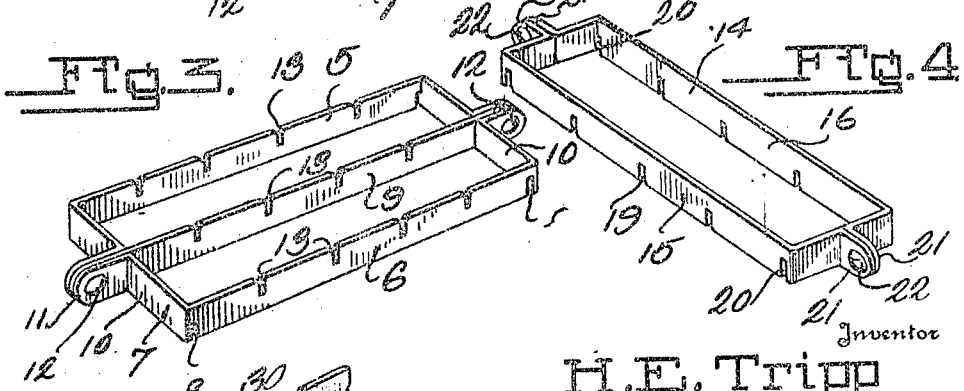
Inventor
H. E. Tripp

UNITED STATES PATENT OFFICE.

HAL EARL TRIPP, OF CHATTANOOGA, TENNESSEE.

BAKING-PAN.

1,308,821. Specification of Letters Patent. Patented July 8, 1919.

Application filed August 2, 1918. Serial No. 248,007.

*To all whom it may concern:*

Be it known that I, HAL E. TRIPP, a citizen of the United States, and a resident of Chattanooga, in the county of Hamilton and State of Tennessee, have invented certain new and useful Improvements in Baking-Pans, of which the following is a specification.

This invention relates to a baking pan designed primarily for use in baking biscuits, muffins, cup cakes or the like, and an object of the invention is to provide a baking pan as specified which includes a plurality of removable partitions which may be removed after the biscuits have been baked to facilitate their removal from the pan.

Another object of the invention is to provide a baking pan which will overcome many of the inconveniences contingent with the forming of ordinary biscuits, muffins or the like, by eliminating the necessity of cutting the dough prior to placing the same in the pan, preventing the biscuits or muffins from sticking to the pan, and preventing scraps or waste of dough in the cutting thereof and consequently eliminating the necessity of rekneading the said scraps for re-cutting.

More specifically, the invention comprehends the provision of a rectangular baking pan which has a frame detachably carried thereby, comprising a plurality of longitudinal ribs and a plurality of frames extending transversely to the first named frame, whereby when all of the frames are connected to each other and to the pan the interior of the pan will be divided into a plurality of rectangular spaces for receiving the dough or batter.

Other objects of the invention will appear in the following detailed description, taken in connection with the accompanying drawing, forming a part of this specification, and in which drawing:

Figure 1 is a top plan of the improved baking pan.

Fig. 2 is a longitudinal section through the pan.

Fig. 3 is a perspective view of one of the dividing frames of the pan.

Fig. 4 is a perspective view of another of the dividing frames of the pan.

Fig. 5 is a fragmentary perspective of a modified form of one of the dividing frames.

Referring more particularly to the drawing, 1 indicates the pan structure, which is preferably rectangular in shape, having the usual upstanding ends and sides 2. The sides 2 of the pan have handles 4 attached thereto, intermediate their ends, in any suitable manner to facilitate the handling and movement of the pan.

The sides 2 and ends 3 of the pan 1 are provided with recesses extending downwardly from their upper edges for a portion of the height thereof.

The recesses in the ends 3 of the pan body 1 engage the end portions of the outermost longitudinally extending ribs 5 and 6 of the frame 7. The ribs 5 and 6 are provided with recesses 8 extending upwardly from their lower edges which engage over the portions of the ends 3 directly beneath the recesses formed therein to permit the upper edges of the frame 7 to lie flush with the upper edges of the ends 3 and sides 2.

The frame 7, comprises the outer ribs 5 and 6 and an intermediate rib 9. The outer ribs 5 and 6 have their end portions angled as shown at 10 and provided with outwardly projecting ears 11. The ears 11 of the outer ribs 5 and 6 abut the surfaces of the end portions of the central rib 9, to which they are attached by rivets or analogous attaching devices indicated at 12, forming the dividing frame 7. The ribs 5, 6 and 9 are provided with recesses 13 formed therein and extending downwardly from their upper edges. These recesses are arranged in alining relation as clearly shown in Fig. 3 and are adapted to receive therein the portions of the ribs 14 and 15 of the frames 16 and 17 which are positioned upwardly of the recesses 19. The recesses 19 extend upwardly from the lower edges of the ribs 15 and 16, of the frame 16' and 17, as clearly shown in Fig. 4 of the drawing and these ribs are also provided with recesses 20 at their ends, which engage over the sides 2 of the body pan 1 for permitting the upper surfaces or edges of the ribs 15 and 16 to lie flush with the upper edges of the sides 2 and ends 3 of the pan and the upper edges of the ribs 5, 6 and 9 of the frame 7. The ribs 15 and 16 of the frames 16' and 17' respectively have their ends angled and provided with outwardly extending ears 21 which are connected by rivets or analogous fastening devices 22.

In making biscuits, with the improved baking pan, the dough may be rolled flat, and then placed upon the pan and pressed into the various compartments formed by the pan 1 and the frames 7 and 16' and 17, or the dough may be placed upon the pan and then rolled to mash it into the various compartments. After the biscuits are thoroughly baked, the frames 16' and 17, and the frame 7 may be removed from the pan and the latter turned upside down for emptying the biscuits therefrom and thus preventing the biscuits from sticking to the pan and facilitating their removal therefrom.

In making muffins, cup cakes or the like, where a batter is used, the necessary amount of batter may be placed in each of the various compartments and its removal therefrom will be facilitated by the removal of the various frames from connection with the pan.

In Fig. 5 of the drawing, a modified form of the dividing frames is illustrated. In this form, the rails 30 have horizontal inwardly extending tongues 31 formed thereon which engage the inner surface of the bottom of the pan 1 and by means of which the biscuits, muffins or cup cakes may be removed from the pan with the removal of the various frames.

Changes in details may be made without departing from the spirit of this invention; but,

I claim:

1. In a baking pan, the combination, of a pan body having upstanding sides, a frame comprising side ribs and an intermediate rib, said side ribs having their end portions bent to lie flush against the outer surface of a pair of opposed sides of the pan body and outwardly to form connecting ears, said side ribs and upstanding sides provided with inter-engaging recessed portions whereby the top of the frame will lie flush with the top of the pan body.

2. In a baking pan, the combination, of a pan body having upstanding sides, a frame comprising side ribs and an intermediate rib, said side ribs having their end portions bent to lie flush against the outer surface of a pair of opposed sides of the pan body and outwardly to form connecting ears, said connecting ears engaging upon opposite sides of the ends of the intermediate rib and being connected thereto, said frame adapted to extend across the interior of said pan body for dividing it into a plurality of compartments, said side ribs and upstanding sides provided with inter-engaging recessed portions whereby the top of the frame will lie flush with the top of the body.

3. In a baking pan, the combination, of a pan body having upstanding sides, a frame comprising side ribs and an intermediate rib, said side ribs having their end portions bent to lie flush against the outer surface of a pair of opposed sides of the pan body and outwardly to form connecting ears, said connecting ears engaging upon opposite sides of the ends of the intermediate rib and being connected thereto, said frame adapted to extend across the interior of said pan body for dividing it into a plurality of compartments, and a pair of frames adapted to extend across said pan body transversely to said first named frame and comprising each a pair of ribs having their end portions bent to lie against portions of the outer surfaces of a pair of opposed sides of the pan and to form facially abutting attaching ears, said side ribs and upstanding sides provided with inter-engaging recessed portions whereby the top of the frame will lie flush with the top of the pan body.

4. In a baking pan, the combination, of a pan body having upstanding sides, a frame comprising side ribs and an intermediate rib, said side ribs having their end portions bent to lie flush against the outer surface of a pair of opposed sides of the pan body and outwardly to form connecting ears, said connecting ears engaging upon opposite sides of the ends of the intermediate rib and being connected thereto, said frame adapted to extend across the interior of said pan body for dividing it into a plurality of compartments, a pair of frames adapted to extend across said pan body transversely to said first named frame and comprising each a pair of ribs having their end portions bent to lie against portions of the outer surfaces of a pair of opposed sides of the pan and to form facially abutting attaching ears, the ribs of said frames being provided with recesses extending upwardly therein from their lower edges near said end portions for engaging over the sides of the pan body and said upstanding sides provided with recessed portions to engage in the recess of the ribs, whereby the upper surfaces of the ribs will lie flush with the upper side of the pan body.

5. In a baking pan, the combination, of a pan body having upstanding sides, provided with recesses extending downwardly from their upper edges, a frame comprising side ribs and an intermediate rib, said side ribs having their end portions bent to lie flush against the outer surface of a pair of opposed sides of the pan body and outwardly to form connecting ears, said ribs provided with recesses extending upwardly therein from their lower edges near said end portions for engaging over the recessed portions of the sides of the pan body whereby the upper surfaces of the ribs will lie flush with the upper edges of the sides of the pan body, a pair of frames comprising ribs adapted to extend across said pan body transversely to the first named frame, the ribs of said first named frame and said pair of frames being provided with registering recesses to permit interlocking of the frame and whereby the upper surfaces of the ribs will lie flush with each other and with the upper surface of the edges of said pan.

6. In a baking pan, the combination, of a pan body having upstanding sides, provided with recesses extending downwardly from their upper edges, a frame comprising side ribs and an intermediate rib, said side ribs having their end portions bent to lie flush against the outer surface of a pair of opposed sides of the pan body and outwardly to form connecting ears, said ribs provided with recesses extending upwardly therein from their lower edges near said end portions for engaging over the recessed portions of the sides of the pan body whereby the upper surfaces of the ribs will lie flush with the upper edges of the sides of the pan body, a pair of frames comprising ribs adapted to extend across said pan body transversely to the first named frame, the ribs of said first named frame and said pair of frames being provided with registering recesses to permit interlocking of the frame and whereby the upper surfaces of the ribs will lie flush with each other and with the upper surface of the edges of said pan, and tongues formed upon certain of said ribs and extending inwardly, at right angles to the ribs, at their lower edges.

HAL EARL TRIPP.